Figure 1:
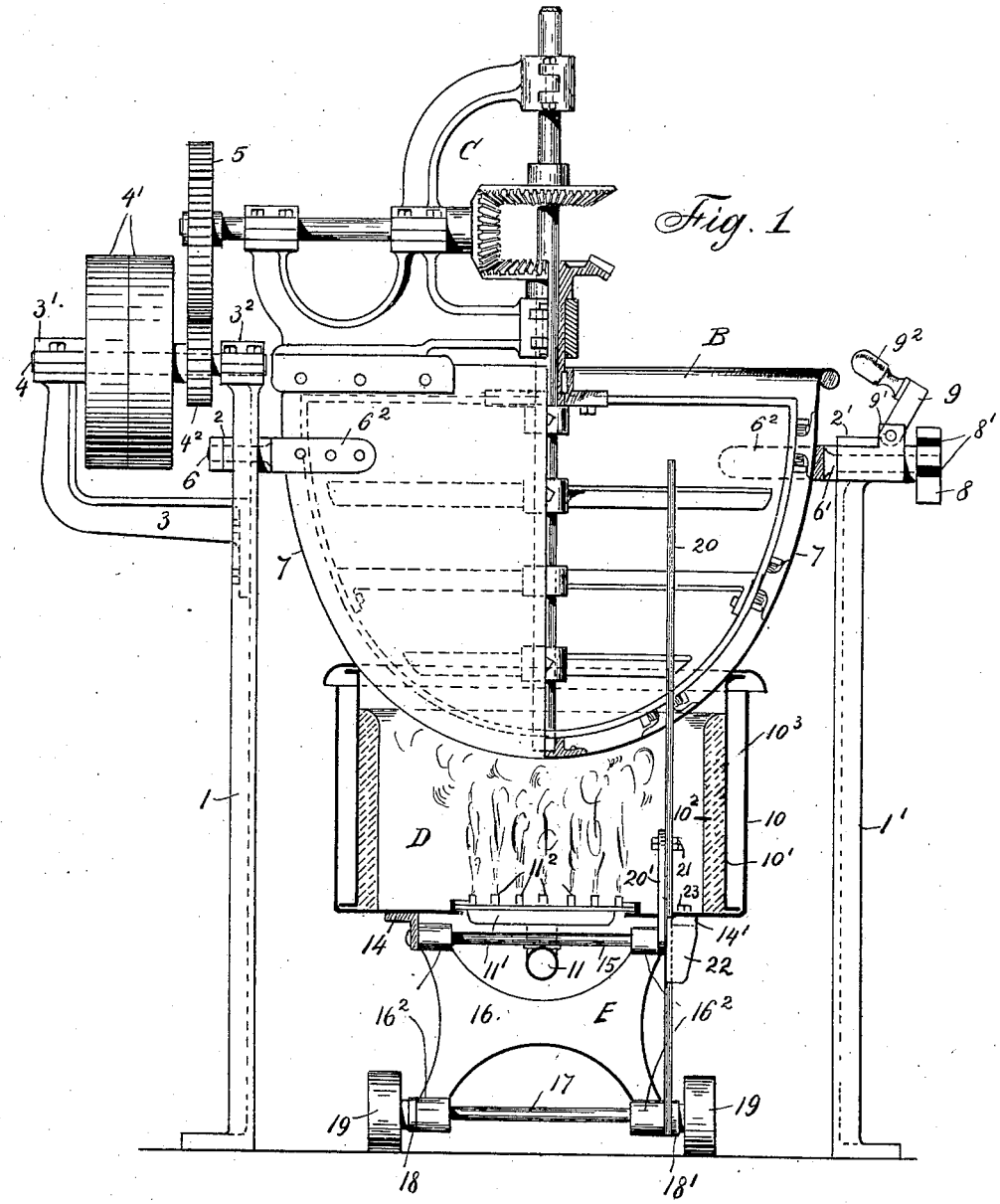

No. 863,657. PATENTED AUG. 20, 1907.
R. J. SAVAGE.
HEATING APPARATUS.
APPLICATION FILED JULY 2, 1906.

2 SHEETS—SHEET 1.

WITNESSES
J. C. Goosmann
R. Jacobsen

INVENTOR
Richard J. Savage.
by Robt. Klotz
Atty

No. 863,657. PATENTED AUG. 20, 1907.
R. J. SAVAGE.
HEATING APPARATUS.
APPLICATION FILED JULY 2, 1906.
2 SHEETS—SHEET 2.
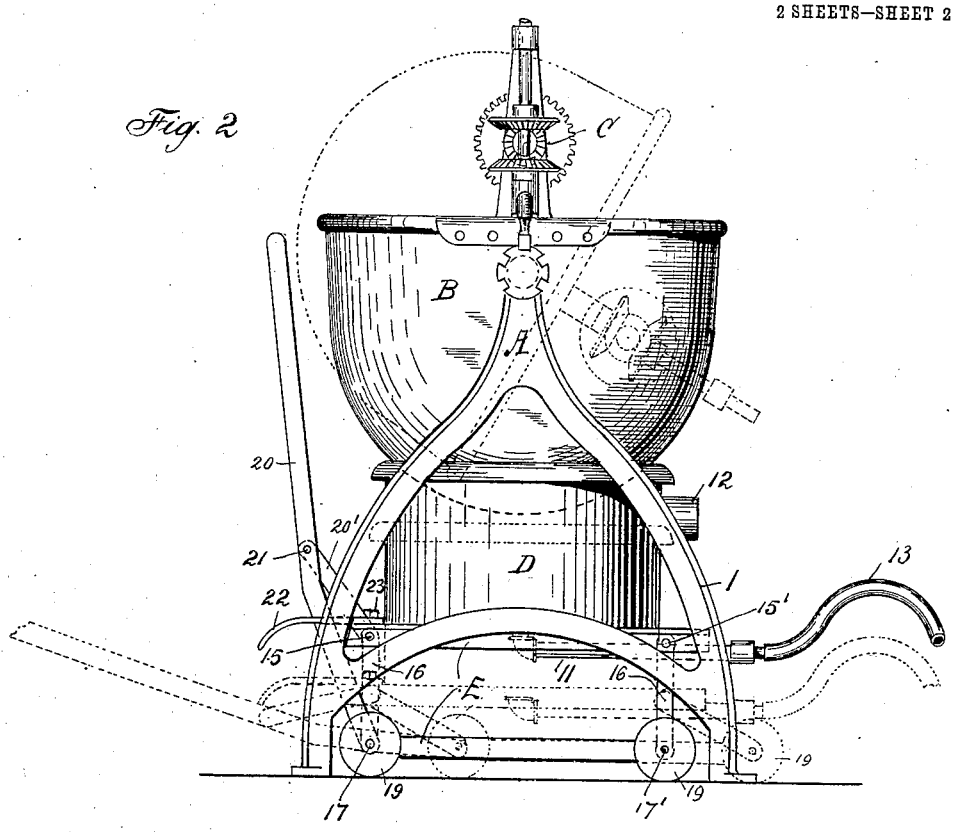
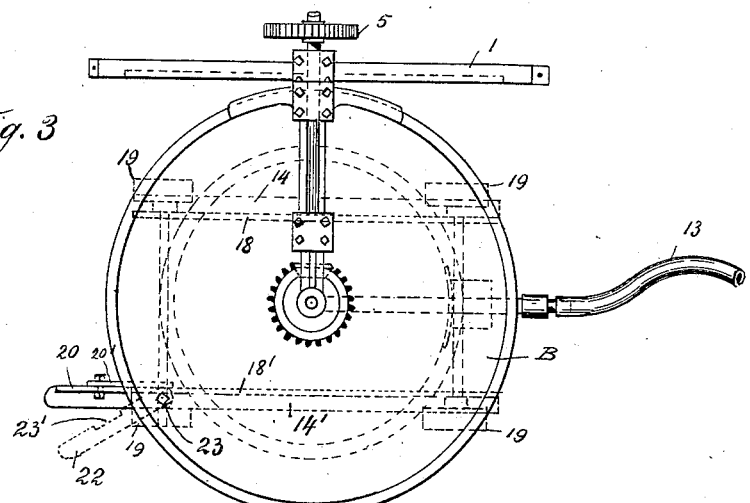
WITNESSES
J. C. Goosmann
R. Jacobsen.
INVENTOR
Richard J Savage
by Robt. Klotz
Atty.

UNITED STATES PATENT OFFICE.

RICHARD JOSEPH SAVAGE, OF CHICAGO, ILLINOIS.

HEATING APPARATUS.

No. 863,657.   Specification of Letters Patent.   Patented Aug. 20, 1907.

Application filed July 2, 1906. Serial No. 324,298.

*To all whom it may concern:*

Be it known that I, RICHARD JOSEPH SAVAGE, a citizen of the United States, and a resident of the city of Chicago, in the county of Cook and State of Illinois, have invented certain new and useful Improvements in Heating Apparatus for Mixing-Kettles, of which the following is an accurate specification.

My invention relates to a novel device for the heating of the contents in mixing kettles used in confectioneries, which device may be used for either gas or coal fire, as circumstances may require, and consists in the features of construction and combination of parts hereinafter fully described and claimed.

The accompanying drawings, illustrating my invention, show a fire-box equipped for gas-fire, the apparatus being so constructed that it can be raised up to the lower outline of the mixing kettle for the purpose of bringing the fire pot into close proximity with the same for heating its contents during the process of mixing, and lowering it subsequently to allow tilting of the kettle for the removal of its contents and for cleaning.

My present invention is an addition to the device forming subject of Letters Patent No. 499,890, granted to me on June 20, 1893, and which relates to improvements in means for operating the stirring device in mixing kettles without interfering with the necessary tilting of the kettle for emptying and cleaning.

In the present invention a heating device has been adapted to the mixing kettle making its operation independent of the use of steam for heating purposes by providing other means which may be used in the latter's place. This is done in order to make the apparatus operative in places where no steam is available, in which case gas—or should that be missing also, coal fire can be successfully used.

The above object is attained by the mechanism illustrated in the accompanying drawings, in which—

Figure 1 is a complete side elevation, showing the fire pot in section and the mixing kettle partly in section, Fig. 2, is a front elevation, showing the arrangement for lowering the fire pot; the outline of the apparatus with the fire pot lowered and the kettle in the tilted position is shown in dotted lines, and Fig. 3 is a plan view in which the catch, whereby the carriage is locked in its elevated position, is shown in dotted lines.

Like characters of reference indicate corresponding parts in all the figures.

In the drawings, A designates the frame in which the mixing kettle B is swingingly suspended.

C is the stirring mechanism, D the fire box in which the required heat is created and E the device by means of which the fire box is raised or lowered when required.

The support A consists of two upright members 1 and 1′, which are provided with journals 2 and 2′ in which the mixing kettle B is swingingly mounted. Bracket 3 is bolted to member 1 and is provided with bearing 3′. A corresponding bearing $3^2$ is located on top of member 1 and a driven shaft 4, upon which is mounted a tight and loose pulley 4′ and a pinion $4^2$, revolves in the said bearings. The stirring device consists of the same parts which form the subject of the above mentioned Letters Patent and are operated by gear connection between gear 5 and pinion $4^2$. Trunnions 6 and 6′ are provided with ears $6^2$ and are riveted to the outer shell 7 of the kettle by means of same. Trunnion 6′ carries a locking disk 8 outwardly of frame member 1′, which contains suitable notches 8′, into which locking knife 9 fits. The latter is pivoted in lugs 9′ with which bearing 2′ is provided and a knob $9^2$ facilitates its locking and unlocking feature.

The fire pot D consists of an outer shell 10 which may be made of any suitable material, preferably cast iron, an inner cylindrical shell 10′ and a fire brick—or any other refractory—lining $10^2$. Space $10^3$ may be filled with insulating material to prevent excessive radiation of heat. The fuel, which is in the form of a gas in the case illustrated, is admitted through supply pipe 11, enters chamber 11′ and passes into a plurality of burners $11^2$, where it is ignited in the customary manner. In order to prevent the escape of heat at the top, the fire pot is adjusted directly under the kettle, establishing intimate contact with the lower outline of the latter and cutting off the chance of heat escape in a most thorough way. The products of combustion escape through exit-pipe 12 and a flexible connection 13 connects the stationary gas line with supply pipe 11.

It will be readily appreciated that instead of gas another form of fuel, such as coal, coke, wood, charcoal, gasolene, alcohol and the like, may be used, in which case it is only necessary to reconstruct the fire pot so that it conforms with the well known requirements of the respective fuel.

When the material in the kettle has been sufficiently reduced by evaporation, it must be removed, for which purpose the kettle has to be tilted. Before that can be done, the fire pot must be lowered to allow the kettle to swing free. This is effected by the device E which is shown in Fig. 2. The upper frame, upon which the fire pot rests, is formed of two horizontal members 14 and 14′, preferably angle iron. These members are secured laterally by steel rods 15 and 15′. Cross-pieces 16 and 16′ form the cross distance pieces between members 14 and 14′. Each of the former is provided with four journals $16^2$ and is rotatably mounted upon the corresponding steel rod with its two upper journals, the side thrust being taken up by horizontal members 14 and 14′. The lower journals $16^2$ rotate upon steel rods 17 and 17′, and brace straps 18 and 18′ are loosely fitted to the corresponding rod, being of a length which corresponds with that of members 14 and 14′. Carriage-wheels 19 are mounted to the outer ends of rods 17 and 17′ so that the device forms a carriage upon which the fire pot D may be rolled into its position under kettle B.

When the fire pot is moved into position, it must be adjusted into intimate contact with kettle B and secured therein. This is effected by operating lever 20 and link strap 20′. The former is rotatably mounted upon rod 17 between journal $16^2$ and longitudinal brace strap 18′, while the latter is rotatably secured to steel rod 15 and pinioned to operating lever 20 by means of pin 21. It will now be readily apparent that the carriage with its fire pot D, can be adjusted intimately to mixing kettle B as shown in Fig. 1 by manipulating operating lever 20 accordingly; and this position is maintained by a locking catch 22, which swings around cap screw 23 secured to member 14′ and engages lever 20 with its notch 23′, which latter is shown in Fig. 3. As soon as locking catch 22 is disengaged with operating lever 20, the carriage collapses on account of the weight of fire pot D, it assumes the position shown in dotted lines in Fig. 2 and can then be removed without difficulty. The kettle may then be tilted and locked in the tilted position by engaging locking knife 9 with the corresponding notch of locking disk 8.

It will be readily appreciated that it is possible to alter the construction of the device slightly as may be deemed advisable in the manufacture of the apparatus, without departing from the scope of my invention.

Having thus fully described the novel features of my invention, I claim as new and desire to secure by Letters Patent:—

1. In a device of the class described the combination with a fire pot, of cross pieces pivotally engaged on the bottom thereof, means connecting the bottom of said cross pieces, an axle journaled in each cross piece, supporting wheels on the axles, means adapted to raise and lower the pot with respect to said wheels and means for locking the pot in raised position.

2. In a device of the class described the combination with a fire pot of transverse rods on the bottom thereof, cross pieces journaled on said rods, an axle journaled on each cross piece, wheels thereon, means rigidly connecting said axles, a lever pivoted on the rear axle and adapted to raise and lower the pot with respect to said wheels, a link connecting said lever with the adjacent cross piece and means for locking said lever in elevated position.

3. In a device of the class described the combination with a fire pot, of transverse rods journaled beneath the same, cross pieces pivotally supported on said rods, an axle journaled on each cross piece, wheels thereon, a lever pivoted on one of said axles and adapted to raise and lower the pot with respect to said wheels, a link connecting said lever with one of said rods and a locking catch pivoted adjacent the pot and adapted to engage the lever and hold the pot in elevated position.

4. In a device of the class described the combination with a fire pot, of parallel members on the bottom thereof, transverse rods on said members, cross pieces pivoted on said rods, an axle journaled at the bottom of each cross piece, wheels thereon, a lever pivoted at its lower end on one of said axles and adapted to raise and lower the pot with respect to said wheels, a link connecting the lever with the adjacent rod, and a locking catch pivoted on one of said parallel members and adapted to engage the lever and hold the pot in elevated position.

5. In a device of the class described the combination with a fire pot of parallel members rigidly engaged on the bottom of said pot, cross pieces pivoted thereto, an axle on each cross piece, wheels thereon, side bars connecting said axles, a lever pivoted on one axle and adapted to raise and lower the pot with respect to said wheels, a link connected with said lever and at the top of the adjacent cross piece, and a locking catch pivoted on one of said parallel members and adapted to engage the lever and hold the pot in elevated position.

In testimony whereof I have signed my name to this specification in the presence of two subscribing witnesses.

RICHARD JOSEPH SAVAGE.

Witnesses:
J. C. GOOSMANN,
R. JACOBSEN.